(12) United States Patent
Commarieu et al.

(10) Patent No.: US 11,999,811 B2
(45) Date of Patent: Jun. 4, 2024

(54) COPOLYMERS OF ESTER AND ETHER UNITS, PROCESSES FOR PRODUCING SAME AND USES THEREOF

(71) Applicant: HYDRO-QUÉBEC, Montréal (CA)

(72) Inventors: Basile Commarieu, Paris (FR); Jean-Christophe Daigle, St-Bruno-de-Montarville (CA); Pierre-Michel Jalbert, Montréal (CA); Gilles Lajoie, Varennes (CA); Catherine Gagnon, Sainte-Julie (CA); Abdelbast Guerfi, Brossard (CA); Michel Armand, Paris (FR); Karim Zaghib, Longueuil (CA)

(73) Assignee: HYDRO-QUÉBEC, Montréal (CA)

( * ) Notice: Subject to any disclaimer, the term of this patent is extended or adjusted under 35 U.S.C. 154(b) by 974 days.

(21) Appl. No.: 16/963,383

(22) PCT Filed: Feb. 5, 2019

(86) PCT No.: PCT/CA2019/050145
§ 371 (c)(1),
(2) Date: Jul. 20, 2020

(87) PCT Pub. No.: WO2019/148299
PCT Pub. Date: Aug. 8, 2019

(65) Prior Publication Data
US 2021/0380745 A1 Dec. 9, 2021

(30) Foreign Application Priority Data
Feb. 5, 2018 (CA) ................. CA 2994005

(51) Int. Cl.
| | | |
|---|---|---|
| *C08F 290/06* | (2006.01) | |
| *C08F 220/06* | (2006.01) | |
| *C08G 63/08* | (2006.01) | |
| *C08G 63/66* | (2006.01) | |
| *C08G 65/26* | (2006.01) | |
| *H01G 11/56* | (2013.01) | |
| *H01M 10/0525* | (2010.01) | |
| *H01M 10/0565* | (2010.01) | |

(52) U.S. Cl.
CPC ........ *C08F 290/061* (2013.01); *C08F 220/06* (2013.01); *C08G 63/08* (2013.01); *C08G 63/66* (2013.01); *C08G 65/2603* (2013.01); *H01G 11/56* (2013.01); *H01M 10/0525* (2013.01); *H01M 10/0565* (2013.01); *H01M 2300/0091* (2013.01)

(58) Field of Classification Search
CPC .... C08G 63/66; C08G 63/664; C08G 63/912; C08G 63/2603; C08G 63/08; H01M 2300/0082; H01M 10/0525; H01M 10/054; H01M 10/0565; H01M 10/0052; H01M 4/625; H01M 4/622; H01M 4/137
See application file for complete search history.

(56) References Cited

U.S. PATENT DOCUMENTS

2005/0234177 A1  10/2005  Zaghib et al.

FOREIGN PATENT DOCUMENTS

| CA | 2 478 659 A1 | 9/2003 |
| CN | 101207204 A | 6/2008 |
| WO | 03/063287 A2 | 7/2003 |
| WO | 2007/012979 A2 | 2/2007 |

OTHER PUBLICATIONS

Kweon, et al. "A novel degradable polycaprolactone network for tissue engineering", Biomaterials, 24, 801-808, 2003. (Year: 2003).*
Supplementary Partial European Search Report dated Oct. 20, 2021, issued by the European Patent Office in corresponding European Application No. 19747279.8-1107 (32 pages).
Yoo, J. S. et al. "Novel pH and Temperature-Sensitive Block Copolymers: Poly(ethylene glycol)-b-poly(£-caprolactone)-b-poly(b-amino ester)", Macromolecular Research, vol. 14, No. 1, Jan. 1, 2006, pp. 117-120, XP055848622.
Tan, B. et al. "Crosslinkable surfactants based on linoleic acid-functionalized block copolymers of ethylene oxide and E-caprolactone for the preparation of stable PMMA latices", Polymer, Elsevier Science Publishers B.V, GB, vol. 46, No. 4, Feb. 7, 2005, pp. 1347-1357, XP027728307.
Huynh et al. " Functionalized injectable hydrogels for controlled insulin delivery", Biomaterials, Elsevier, vol. 29, No. 16, Mar. 10, 2008, pp. 2527-2534, XP022559050.
Alloin, F. et al.,"Electrochemical comparison of several crosslinked polyethers" Electrochimica acta, vol. 43. Nos. 10-11, (1998), pp. 1199-1204.
Armand, M."Polymer Solid Electrolytes—An Overview" Solid State Ionics, vol. 9, (1983), pp. 745-754.
Brissot, C. et al.,"Dendritic growth mechanisms in lithiumpolymer cells" Journal of power sources, vol. 81, (1999), pp. 925-929.
Fernandes, M. et al.,"Li+- and Eu3+-Doped Poly(ε-caprolactone)/Siloxane Biohybrid Electrolytes for Electrochromic Devices" ACS Applied Materials & Interfaces, vol. 3.8, (2011), pp. 2953-2965.
Guo, Y. et al.,"Reviving Lithium-Metal Anodes for Next-Generation High-Energy Batteries" Advanced materials, vol. 29, No. 29, (2017), pp. 1700007, (1 of 25).
Hallinan Jr, D.T. et al.,"Polymer Electrolytes" Annual review of materials research, vol. 43, (2013), pp. 503-525.
He, W. et al.,"Carbonate-linked poly(ethylene oxide) polymer electrolytes towards high performance solid state lithium batteries" Electrochimica Acta , vol. 225, (2017), pp. 151-159.

(Continued)

*Primary Examiner* — Christopher M Rodd
(74) *Attorney, Agent, or Firm* — Womble Bond Dickinson (US) LLP (57) ABSTRACT

The present technology relates to a polymer comprising at least one ester repeating unit and one ether repeating unit for use in an electrochemical cell, particularly in electrochemical accumulators such as lithium batteries, sodium batteries, potassium batteries and lithium-ion batteries. More specifically, the use of this polymer as a solid polymer electrolyte (SPE), as a matrix for forming gel electrolytes, or as a binder in an electrode material are also contemplated.

37 Claims, 3 Drawing Sheets

(56) References Cited

OTHER PUBLICATIONS

Khurana, R. et al.,"Suppression of Lithium Dendrite Growth Using Cross-Linked Polyethylene/Poly(ethylene oxide) Electrolytes: A New Approach for Practical Lithium-Metal Polymer Batteries" Journal of the American Chemical Society, vol. 136, No. 20, (2014), pp. 7395-7402.

Kono, M. et al.,"Network Polymer Electrolytes with Free Chain Ends as Internal Plasticizer" Journal of the Electrochemical Society, vol. 145, No. 5, (1998), pp. 1521-1527.

Leones, R. et al.,"Polymer electrolytes for electrochromic devices through solvent casting and sol-gel routes" Solar Energy Materials and Solar Cells, vol. 169, (2017), pp. 98-106.

Lin, C.K. et al.,"Investigating the effect of interaction behavior on the ionic conductivity of Polyester/LiClO4 blend systems" Polymer, vol. 52, No. 18, (2011), pp. 4106-4113.

Lin, Z. et al.,"Amorphous modified silyl-terminated 3D polymer electrolyte for highperformance lithium metal battery" Nano Energy, vol. 41, (2017), pp. 646-653.

Lu, Q. et al.,"Dendrite-Free, High-Rate, Long-Life Lithium Metal Batteries with a 3D Cross-Linked Network Polymer Electrolyte" Advanced materials, vol. 29, No. 13, (2017), pp. 1604460 (1-8).

Mindemark, J. et al.,"High-performance solid polymer electrolytes for lithium batteries operational at ambient temperature" Journal of Power Sources, vol. 298, (2015), pp. 166-170.

Mindemark, J. et al., Copolymers of trimethylene carbonate and ε-caprolactone as electrolytes for lithium-ion batteries Polymer, vol. 63, (2015), pp. 91-98.

Pereira, R. F. P. et al.,"Ion conducting and paramagnetic d-PCL(530)/siloxane-based biohybrids doped with Mn2+ions" Electrochimica Acta, vol. 211, (2016), pp. 804-813.

Porcarelli, L. et al.,"Super Soft All-Ethylene Oxide Polymer Electrolyte for Safe All Solid Lithium Batteries" Scientific reports, vol. 6, (2016), 19892, 14 pages.

International Search Report (PCT/ISA/210) mailed on Aug. 8, 2019, by the Canadian Patent Office as the International Searching Authority for International Application No. PCT/CA2019/050145, with English-language translation (6 pages).

Written Opinion (PCT/ISA/237) mailed on Aug. 8, 2019, by the European Patent Office as the International Searching Authority for International Application No. PCT/CA2019/050145, with English-language translation (15 pages).

Office Action issued on Dec. 13, 2021, by the Intellectual Property India, Government of India in corresponding Indian Patent Application No. 202017033328, and an English Translation of the Office Action. (5 pages).

Ugur M H et al., "Synthesis by UV-curing and characterisatron of polyurethane acrylate-lithium salts-based polymer electrolytes in lithium batteries," *Chemical Papers*, 2014, vol. 68 (11), pp. 1561-1572.

Extended European Search Report dated Feb. 23, 2022, issued by the European Patent Office in corresponding European Application No. Bet 20M2589, (35 pages).

Tzeng Jy-Jiunn et al."Synthesis, Characterization, and Visible Light Curing Capacity of Polycaprolactone Acrylate", Biomed Research International, vol. 2018, Jan. 1, 2018, pp. 1-8, XP055890825.

Li, J. et al. "Preparation and characterization of inclusion complexes formed bybiodegradable poly(e-caprolactone)-poly(tetrahydrofuran)-poly(ecaprolactone) triblock copolymer and cyclodextrins" Polymer, Elsevier, vol. 45, No. 6, Mar. 1, 2004, pp. 1777-1785, XP004490333.

Kweon, H et al. "A novel degradable polycaprolactone networks for tissue engineering", Biomaterials, Elsevier, Amsterdam, NL, vol. 24, No. 5, Feb. 1, 2003, pp. 801-808, XP004398698.

Chuck C. J. et al"Air-Stable Titanium Alkoxide Based Metal-Organic Framework as an Initiator for Ring-Opening Polymerization of Cyclic Esters", Inorganic chemistry, vol. 45, issue 17, Jul. 22, 2006,pp. 6595-6597, XP055890833.

* cited by examiner

Figure 4

# COPOLYMERS OF ESTER AND ETHER UNITS, PROCESSES FOR PRODUCING SAME AND USES THEREOF

This application claims priority, under the applicable law, to Canadian Patent Application No. 2,994,005 filed on Feb. 5, 2018, the content of which is incorporated herein by reference in its entirety and for all purposes.

TECHNICAL FIELD

The present application relates to the field of polymers and their uses in electrochemical applications, particularly in lithium batteries. More particularly, the technology relates to the field of polymers for use as a solid polymer electrolyte (SPE), as a matrix for forming gel electrolytes, or as a binder in electrode materials.

BACKGROUND

Conventional batteries commonly use liquid electrolytes, such as ethylene carbonate, propylene carbonate, and diethyl carbonate, capable of effectively solubilizing and ionizing ionic salts such as $LiPF_6$, LiTFSI, and LiFSI. However, these liquid electrolytes present significant safety and toxicity problems.

Although the lithium-ion technology dominates the battery market today, the use of alkali metals, such as lithium, as anodes is becoming more common. This is explained by the very high energy density of these materials. On the other hand, these metals can react with liquid electrolytes, leading to the degradation of the latter and, as a result, to a gradual decrease in the performance of the battery throughout its use. In addition, one of the major problems associated with the use of these metals is the formation of dendritic structures that can lead to a violent short circuit between the electrodes when they manage to pierce the separator. This reaction can lead to the ignition of the electrolyte, even to the point of battery explosion (see Guo, Y. et al., *Advanced Materials*, 29.29 (2017): 1-25). The degradation of the electrolyte can also generate reactive and toxic by-products which can, in the long term, expose the user to additional hazards, in addition to greatly reducing the capacities of the electrochemical system.

These safety and stability issues can be significantly reduced by the use of non-volatile, non-flammable solid polymer electrolytes (SPEs) that are more stable to alkali metals. The resulting elasticity of such systems makes it possible to design new architectures for the batteries and to target new applications such as, for example, their uses in photochemical cells and flexible accumulators. The resulting elasticity also makes it possible to increase the shock resistance of the batteries. Moreover, by varying the mechanical properties of the polymers, it is possible to prevent the formation of dendritic structures (see Mindemark, J. et al., *Polymer* 63 (2015): 91-98). The formation of such dendritic structures can be significantly, or even completely inhibited by using polymers with high transport numbers (see Brissot, C. et al., *Journal of Power Sources* 81-82 (1999): 925-929). In addition to broadening the possibilities of technological applications, the use of SPEs therefore makes it possible to design solid-state electrochemical systems that are much safer and more efficient than their counterparts based on the use of liquid electrolytes.

In 1975, V. Wright demonstrated that poly(ethylene oxide) (PEO) is capable of solubilizing salts. Subsequently, Armand, M. B. et al. were the first to propose its use as an SPE in batteries (see Armand, M. B. et al., Fast Ion Transport in Solids (1979): 131). The ionic conductivity of this polymer is very high (in the order of $10^{-3}$ $S·cm^{-1}$) when the polymer is in the molten state (see Hallinan Jr, D. T. et al., Annual review of materials research 43 (2013): 503-525). In addition, this material is inexpensive, non-toxic, and is easily adaptable to existing technologies. However, this semi-crystalline polymer sees its ionic conductivity decrease drastically at operating temperatures below its melting point (i.e. at about 64° C.). This property is attributed to a significantly more difficult ionic transport in its crystalline phase (see Armand, M., Solid State Ionics 9 (1983): 745-754). Since then, most studies have focused on modifying its architecture in order to reduce its crystallinity. More particularly, by the formation of branched polymers and block copolymers. However, it seems that today the limits of this type of polymer are close to being reached. Indeed, other factors limit the use of this polymer as an SPE, including its low transport number (<0.3) which is due to the strong complexation of lithium ions by the polymer, resulting in significant charge separation in the battery, the formation of dendritic structures, and an electrochemical stability limited to a potential of about 4 V, which makes its use difficult with high voltage materials, such as nickel manganese cobalt oxide (NMC) and lithium cobalt dioxide ($LiCoO_2$) (see He, W. et al., supra).

There are, however, other polymer structures capable of efficiently solvating $Li^+$ cations which can be used as a SPE. These polymer structures generally contain —O—, —C=O—, and —O—(C=O)—O— functions. Among them are ethers (such as tetrahydrofuran (THF), oxetane, 1,3-dioxolane, and propylene oxide), esters (for example, caprolactone), and carbonates (for example, ethylene carbonate, trimethylene carbonate, and propylene carbonate).

Polycaprolactone, for example, has good ionic conductivity (see Lin, C-K. et al., Polymer 52.18 (2011): 4106-4113). However, like poly(ethylene oxide), this polymer is semi-crystalline and crystallizes at about 60° C., thus limiting its use at higher temperatures. By modifying its architecture and, mainly, by introducing units other than caprolactone, it is possible to reduce the crystallinity of this polymer (see Mindemark, J. et al., Journal of Power Sources 298 (2015): 166-170). In addition to having conductivities of more than $4.1 \times 10^{-5}$ $S·cm^{-1}$, these copolymers based on caprolactone units have high transport numbers (>0.6). The use of solid polymer electrolytes based on caprolactone is even more interesting since this molecule can be biobased, biocompatible, biodegradable, and the polymerization step is simpler and safer than that of ethylene oxide. However, the units currently used to break the crystallinity of polycaprolactone are expensive and increase the glass transition ($T_g$) of the copolymer, which generally has a negative effect on the ionic conductivity. Therefore, there is thus a need to find a new strategy to improve the performance of this type of polymer.

The SPEs can be in thermoplastic or thermosetting form. Numerous studies report the use of crosslinked SPEs, in particular, to prevent the formation of dendrites thanks to their superior mechanical properties, but also, because they can play both the role of electrolyte and physical separator between the positive electrode and negative electrode (see Khurana, Rachna, et al., Journal of the American Chemical Society 136.20 (2014): 7395-7402; and Lu, Q. et al., Advanced Materials 29.13 (2017)). In addition, when the crosslinking density is high, they generally see their high voltage stability increased. The vast majority of crosslinked SPEs are based on the use of ethylene oxide and/or propylene oxide units (see Lu, Q. et al.; Porcarelli, L. et al., Scientific reports 6 (2016): 19892; Lin, Z. et al., Nano Energy 41 (2017): 646-653; and Kono, M. et al., Journal of the Electrochemical Society 136 (1998): 1521-1527). Hydro-Québec's patent (WO2003063287 A2) presents in particular an example of a crosslinked ethylene oxide-propylene oxide copolymer. Several studies report the addition of plasticizing agents (such as solvents) in the three-dimensional network of these crosslinked SPEs to increase their ionic conductivity. However, these gel polymer electrolytes see their mechanical properties decrease, which brings us back to the problems of dendrite formation and poor stability of organic molecules in contact with lithium. Studies suggest the use of other types of polymers such as polyethers (other than poly(ethylene oxide)), polyesters, and polycarbonates as a thermosetting base. For example, low molecular weight caprolactone oligomers are used for silicone-based hybrid ion-conducting electrolytes for applications in electrochromic systems (see Pereira, R. F. P. et al., Electrochimica Acta 211 (2016): 804-813; Leones, R. et al., Solar Energy Materials and Solar Cells 169 (2017): 98-106; and Fernandes, M. et al., ACS applied materials & interfaces 3.8 (2011): 2953-2965). However, in addition to having a low ionic conductivity at room temperature (less than $10^{-6}$ S/cm), this type of electrolyte requires aging for several weeks. Ugur, M. H. et al. propose a SPE based on the crosslinking of polycaprolactone via polyurethane acrylate units allowing to reach ionic conductivities of $1 \times 10^{-4}$ S/cm at room temperature, when impregnated with a liquid electrolyte (see Ugur, M. H. et al., Chemical Papers 68.11 (2014): 1561-1572). Given the high polarization of the system, the only cycling result presented was inconclusive. Alloin, F. et al. propose the crosslinking of polytetrahydrofuran oligomers to form SPEs. However, they show that thermosetting polymers based on tetrahydrofuran repeating units are less good ionic conductors than their counterparts based on ethylene oxide units (see Alloin, F. et al., Electrochimica Acta 43.10 (1998): 1199-1204).

SUMMARY

According to a first aspect, the present disclosure relates to a polymer comprising at least one ester repeating unit and one ether repeating unit, the polymer being of Formula I:

Formula I wherein:
  x, y and z are integers each independently selected such that the average molecular weight of the polymer is between 200 g/mol and 5,000,000 g/mol, where x≥1 and y+z≥1;
  $R_1$ and $R_2$ are linear or branched substituents each independently selected from hydrogen, $C_{1-21}$alkyl, $C_{2-22}$alkenyl, $C_{1-10}$alkyl-(acrylate), and $C_{1-10}$alkyl-(methacrylate);
  n, m, o, and p are integers, where o is between 1 and 10 and n, m and p are between 0 and 10; and
  A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups.

According to one embodiment, n is between 0 and 3 and $R_1$ is selected from hydrogen, a methyl, a —$CH_2$—O—$CH_2$—CH=$CH_2$ group, and a —CH=$CH_2$ group, o is between 2 and 4, p is between 2 and 4, m is between 0 and 4, and $R_2$ is selected from hydrogen and a methyl. For example, $R_1$ is hydrogen and n=3, A and B are acrylates, $R_2$ is hydrogen, and m=4.

For example, the polymer as defined herein is a thermoplastic polymer or a thermosetting polymer.

According to another embodiment, at least one of the A, B, $R_1$ and $R_2$ groups comprises functionalities allowing the crosslinking of said polymer.

According to one example, the crosslinking is carried out by a reaction selected from a radical-type reaction, a Diels-Alder reaction, a click chemistry, an alkene hydrothiolation reaction, a ring opening reaction, a vulcanization, a cycloaddition, an esterification, and an amidation.

According to one example, the crosslinking is carried out by UV irradiation, by thermal treatment, by microwave, under an electron beam, by gamma irradiation, or by X-ray irradiation.

According to one example, the crosslinking is carried out in the presence of a crosslinking agent, a thermal initiator, a catalyst, a plasticizing agent, or a combination of at least two thereof.

Another aspect refers to a composition comprising at least one polymer as defined herein, and one or more liquid electrolytes, ionic salts, ionic liquids, polymers, inorganic particles, polar aprotic solvents, or additives.

According to another aspect, the present description relates to an electrolyte comprising a polymer as defined herein. For example, the electrolyte is a solid polymer electrolyte (SPE) or a gel electrolyte.

According to one embodiment, the electrolyte further comprises an ionic salt, an ionic liquid, a separator, a polar aprotic solvent, an additive, or a combination of at least two thereof.

According to one example, the ionic salt is a lithium salt selected from lithium hexafluorophosphate (LiPF$_6$), lithium bis(trifluoromethanesulfonyl)imide (LiTFSI), lithium bis (fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl) imide (LiBETI), lithium tetrafluoroborate (LiBF$_4$), lithium bis(oxalato)borate (LiBOB), lithium nitrate (LiNO$_3$), lithium chloride (LiCl), lithium bromide (LiBr), lithium fluoride (LiF), lithium perchlorate (LiClO$_4$), lithium hexafluoroarsenate (LiAsF$_6$), lithium trifluoromethanesulfonate (LiSO$_3$CF$_3$) (LiTf), lithium fluoroalkylphosphate Li[PF$_3$(CF$_2$CF$_3$)$_3$](LiFAP), lithium tetrakis(trifluoroacetoxy)borate Li[B(OCOCF$_3$)$_4$](LiTFAB), lithium bis(1,2-benzenediolato(2-)-O,O')borate Li[B(C$_6$O$_2$)$_2$](LBBB), and their combinations.

According to another example, the polar aprotic solvent is selected from ethylene carbonate (EC), diethyl carbonate (DEC), propylene carbonate (PC), dimethyl carbonate (DMC), ethylmethyl carbonate (EMC), γ-butyrolactone (γ-BL), vinylene carbonate (VC), methyl butyrate (MB), γ-valerolactone (γ-VL), 1,2-dimethoxyethane (DME), 1,2-diethoxyethane (DEE), 2-methyltetrahydrofuran, dimethylsulfoxide, formamide, acetamide, dimethylformamide, dioxolane, acetonitrile, propylnitrile, nitromethane, ethylmonoglyme, trimethoxymethane, dioxolane derivatives, sulfolane, methylsulfolane, propylene carbonate derivatives, tetrahydrofuran, and their mixtures.

According to another aspect, the present description relates to an electrode material comprising an electrochemically active material and a polymer as defined herein. For example, the polymer is a binder.

According to an additional aspect, the present description relates to an electrochemical cell comprising a negative electrode, a positive electrode and an electrolyte, wherein at least one of the negative electrode, the positive electrode and the electrolyte comprises a polymer as defined herein.

According to one embodiment, the positive electrode comprises a positive electrode electrochemically active material and a binder, optionally an electronically conductive material, or a combination thereof. For example, the binder comprises a polymer as defined herein. For example, the conductive material is selected from carbon black, Ketjen™ carbon, acetylene black, graphite, graphene, carbon nanotubes, and carbon fibers (such as carbon nanofibers, or VGCFs formed in the gas phase), or a combination of at least two thereof.

Finally, the present description refers to an electrochemical accumulator comprising at least one electrochemical cell as defined herein. For example, the electrochemical accumulator is selected from a lithium battery, a sodium battery, a potassium battery, and a lithium-ion battery.

DETAILED DESCRIPTION

All the technical and scientific terms and expressions used herein have the same definitions as those commonly understood by the person skilled in the art when relating to the present technology. The definition of some terms and expressions used herein is nevertheless provided below.

The term "about" as used herein means approximately, in the region of, and around. When the term "about" is used in connection with a numerical value, it modifies it, for example, above and below by a variation of 10% with respect to the nominal value. This term can also take into account, for example, the experimental error of a measuring apparatus or rounding of the value.

When a range of values is mentioned in the present application, the lower and upper limits of the range are, unless otherwise indicated, always included in the definition.

The chemical structures described herein are drawn according to the field standards. Also, when an atom, such as a carbon atom, as drawn seems to include an incomplete valency, then the valency is assumed to be satisfied by one or more hydrogen atoms even though these are not explicitly represented.

As used herein, the term "alkyl" refers to saturated hydrocarbon groups having between 1 to 21 carbon atoms, including linear or branched alkyl groups. Non-limiting examples of alkyls can include methyl, ethyl, propyl, butyl, pentyl, hexyl, heptyl, octyl, nonyl, decyl, isopropyl, tert-butyl, sec-butyl, isobutyl, and analogs. The term "$C_1$-$C_n$alkyl" refers to an alkyl group having from 1 to the indicated "n" number of carbon atom(s).

As used herein, the term "alkenyl" refers to unsaturated hydrocarbons including at least one double bond between two carbon atoms. Non-limiting examples of alkenyl groups include vinyl, allyl, 1-propen-2-yle, 1-buten-3-yle, 1-buten-4-yle, 2-buten-4-yle, 1-penten-5-yle, 1,3-pentadien-5-yle, and the like. The term "$C_2$-$C_n$alkenyl" refers to an alkenyl group having from 2 to the indicated "n" number of carbon atom(s).

As used herein, the term "alkynyl" refers to unsaturated hydrocarbons including at least one triple bond between two carbon atoms. Non-limiting examples of alkynyl groups include ethynyl groups, 1-propyn-3-yle, 1-butyn-4-yle, 2-butyn-4-yle, 1-pentyn-5-yle, 1,3-pentadiyn-5-yle, and the like. The term "$C_2$-$C_n$alkynyl" refers to an alkynyl group having from 2 to the indicated "n" number of carbon atom(s).

As used herein, the term "alkoxy" refers to an alkyl group having an oxygen atom attached thereto, the latter being between two carbon atoms. The term "alkoxy" includes both substituted and unsubstituted alkoxy groups. Representative alkoxy groups include groups having from 1 to about 10 carbon atoms, for example, methoxy, ethoxy, isopropoxy, propoxy, butoxy, pentoxy, fluoromethoxy, difluoromethoxy, trifluoromethoxy, and the like.

The term "substituted", when in association with a group refers to a group where at least one hydrogen atom has been replaced with an appropriate substituent. These substituents can also be substituted if permissible, for example, if it contains an alkyl group, an alkoxy group, an alkenyl group, an alkynyl group, etc.

The present application describes copolymers including both ether and ester repeating units introducing defects in the repeating structure of the copolymer thus leading to a decrease in crystallinity compared to the homopolymers used alone. These copolymers make it possible to obtain functional SPEs at room temperature, by combining the good electrochemical and physicochemical properties of the ether and ester repeating units. These properties are also useful when the copolymers as described herein are used in the composition of gel electrolyte matrices, of composites based on the addition of nanoparticles, or as binders in electrodes. Knowing that a limited diffusion of lithium ions compared to anions induces the formation of a concentration gradient responsible for the nucleation of dendrites, it is essential to use polymers with the highest possible transport numbers in order to prevent this unwanted reaction. The polymers of the present application have high transport numbers in comparison with poly(ethylene oxide) which is generally used in the targeted applications.

The present application therefore describes copolymers having low crystallization temperatures, very low glass transitions ($T_g$), and high transport numbers, which is desirable for the efficient use of SPEs at room temperature. The copolymers described herein can be crosslinked by different stimuli to form, for example, thermosetting polymers having high mechanical properties, being resistant, and preventing the formation of dendrites. The mechanical strength can also be reinforced by the addition of nanoparticles such as $SiO_2$, $Al_2O_3$, $TiO_2$, or any other suitable nanoparticles. These crosslinked polymers can also be used as a "hard" polymer gel base when their three-dimensional network is impregnated with liquid electrolytes and/or ionic liquids to increase the ionic conductivity of the polymer while retaining superior mechanical properties which can prevent the formation of dendrites. The present application therefore describes that it is possible to replace the gels commonly used in lithium-ion batteries whose poor mechanical properties cannot prevent the formation of such dendrites, and whose non-ionic conducting main structure implies the use of a large amount of liquid electrolyte.

The present description relates to a polymer comprising at least one ester repeating unit and one ether repeating unit. For example, the polymer is represented by Formula I:

Formula I wherein:
- x, y and z are integers each independently selected such that the average molecular weight of the polymer is between 200 g/mol and 5,000,000 g/mol; $x \geq 1$; $y+z \geq 1$;
- $R_1$ and $R_2$ are linear or branched substituents each independently selected from hydrogen, $C_{1-21}$alkyl, $C_{2-22}$alkenyl, $C_{1-10}$alkyl(acrylate), and $C_{1-10}$alkyl(methacrylate);
- n, m, o, and p are integers representing the average number of units in the polymer; o is between 1 and 10; n, m and p are between 0 and 10; and

A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups.

According to one example, the monomers before polymerization used to form the ether units can be, for example, ethylene oxide, propylene oxide, tetrahydrofuran, oxymethylene, trimethylene oxide, trioxymethylene, allyl glycidyl ether, and 3,4-epoxy-1-butene. Alternatively, n is between 0 and 3, and $R_1$ is selected from hydrogen, a methyl, a —$CH_2$—O—$CH_2$—CH=$CH_2$ group, and a —CH=$CH_2$ group. According to one variant of interest, $R_1$ is hydrogen and n is 3.

According to another example, the monomers before polymerization used to form the ester units can be, for example, 1,4-butylene adipate, 1,3-propylene succinate, ethylene adipate, 1,3-propylene glutarate, and ethylene succinate. Alternatively, the ester units can be obtained via the ring opening of lactones such as α-acetolactone, β-propiolactone, γ-butyrolactone, δ-valerolactone, and ε-caprolactone. According to another alternative, they can be obtained by the ring opening of a lactide or a glycolide. According to another alternative, o is between 2 and 4, and p is between 2 and 4. According to another alternative, m is between 0 and 4, and $R_2$ is selected from hydrogen and methyl. According to one variant of interest, $R_2$ is hydrogen, and m is 4.

According to one example, A is an acrylate group. According to another example, B is an acrylate group. According to one variant of interest, A and B are acrylate groups.

According to one variant of interest, $R_1$ is hydrogen, n is 3, $R_2$ is hydrogen, m is 4, and A and B are acrylate groups. According to another variant of interest, $R_1$ is hydrogen, n is 3, $R_2$ is hydrogen, m is 4, z is 0, and A and B are acrylate groups. For example, the polymer is represented by Formula II:

Formula II where x, y, and z are as previously defined.

According to one example, the polymer of Formula II can be prepared by a polymerization process as illustrated in Scheme 1:

Scheme 1 p-toluenesulfonic acid/hydroquinone/toluene
acrylic acid
100° C.

-continued

According to one example, the average molecular weight of the polymer of Formula I is between 200 g/mol and 5,000,000 g/mol, particularly between 200 g/mol and 1,000,000 g/mol, more particularly between 200 g/mol and 500,000 g/mol, even more particularly between 400 g/mol and 100,000 g/mol, and ideally between 400 g/mol and 20,000 g/mol, upper and lower limits included. According to another example, the average molecular weight of the polymer of Formula II is between 200 g/mol and 5,000,000 g/mol, particularly between 200 g/mol and 1,000,000 g/mol, more particularly between 200 g/mol and 500,000 g/mol, even more particularly between 400 g/mol and 100,000 g/mol, and ideally between 400 g/mol and 20,000 g/mol, upper and lower limits included.

The ester and ether repeating units can be arranged alternately, randomly, or blockwise. According to another example, the ester and ether repeating units are each linked to a polymer in a configuration selected from linear, star, and branched configurations. According to one variant, the polymer is a branched or hyperbranched polymer including comb polymers and dendritic polymers. According to another variant, the polymer is a star polymer and the linear chains of said star polymer are of homogeneous length and structure, alternatively they are of heterogeneous length and structure.

According to one example, the polymer of the present description can have in its structure both one or more ionic conductor segment(s) and one or more function(s) that can allow the controlled crosslinking of the polymer. According to one example, the polymer further comprises functionalities allowing its controlled crosslinking under different external stimuli. For example, at least one of the A, B, $R_1$ and $R_2$ groups includes functionalities allowing the crosslinking of said polymer. For example, crosslinking makes it possible to obtain a three-dimensional structure very resistant to high voltages and further allowing the prevention of dendrite formation. The selected repeating units can provide the polymer with a high transport number. Crosslinking can be carried out by a reaction selected from a radical-type reaction, a Diels-Alder reaction, a click chemistry, an alkene hydrothiolation reaction, a ring opening reaction, a vulcanization, a cycloaddition, an esterification, and an amidation. For example, crosslinking is carried out by UV irradiation, by thermal treatment, by microwave, under an electron beam, by gamma irradiation, or by X-ray irradiation. Crosslinking can also be carried out in the presence of a crosslinking agent, a thermal initiator, a UV initiator, a catalyst, a plasticizing agent such as tetraethylene glycol dimethyl ether (or tetraglyme), poly(ethylene glycol) dimethyl ether (PEGDME), and such as conventional liquid electrolytes, molten salt electrolytes (ionic liquid), or a combination of at least two thereof. For example, the UV crosslinking agent is 2,2-dimethoxy-2-phenylacetophenone (Irgacure™ 651).

According to another example, said polymer is a thermoplastic polymer or a thermosetting polymer.

According to one variant, said polymer can be included in a composition comprising at least one polymer as defined herein, and one or more liquid electrolytes, ionic salts, ionic liquids, polymers, inorganic particles, polar aprotic solvents, or additives.

According to one variant, said polymer can be included in an electrolyte such as a solid or gel electrolyte. When the polymer described herein is used in a solid or gel electrolyte, the latter can further comprise a liquid electrolyte, an ionic salt, an ionic liquid, another polymer, a separator, a single-ion polymer, inorganic particles, a polar aprotic solvent, an additive, or a combination of at least two thereof. For example, it is possible, by varying the crosslinking density and the inserted groups, to obtain a highly ionically conductive impregnated material while maintaining superior mechanical properties preventing the formation of dendrites. The addition of an ionic salt can also increase the transport number of the polymer and its ionic conductivity.

According to one variant, the electrolyte is a solid polymer electrolyte (SPE) that can be used in an electrochemical cell or an electrochemical accumulator, for example, an "all solid-state" type electrochemical accumulator. According to another variant of interest, the electrolyte is a gel electrolyte.

According to one example, the polymer of the present description can further have in its structure one or more function(s) that can lead to its grafting on the surface of one or more element(s) of the positive electrode or the negative electrode, or on the surface of solid elements contained in the SPE.

Non-limiting examples of separators can include polyethylene (PE), polypropylene (PP), cellulose, polytetrafluoroethylene (PTFE), polyvinylidene fluoride (PVDF), and polypropylene-polyethylene-polypropylene (PP/PE/PE) membranes.

For example, the ionic salt can be a lithium salt. Non-limiting examples of lithium salts include lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$(LiFAP), lithium tetrakis(trifluoroacetoxy)borate $Li[B(OCOCF_3)_4]$(LiTFAB), lithium bis(1,2-benzenediolato(2-)-O,O')borate $Li[B(C_6O_2)_2]$(LBBB), and combinations thereof or compositions comprising them. According to one variant of interest, the lithium salt is lithium bis(trifluoromethanesulfonyl)imide (LiTFSI).

Non-limiting examples of polar aprotic solvents comprise ethylene carbonate (EC), diethyl carbonate (DEC), propylene carbonate (PC), dimethyl carbonate (DMC), ethylmethyl carbonate (EMC), vinylene carbonate (VC), methyl butyrate (MB), γ-butyrolactone (γ-BL), γ-valerolactone (γ-VL), 1,2-dimethoxyethane (DME), 1,2-diethoxyethane (DEE), 2-methyltetrahydrofuran, dimethylsulfoxide, formamide, acetamide, dimethylformamide, dioxolane, acetonitrile, propylnitrile, nitromethane, ethylmonoglyme, trimethoxymethane, dioxolane derivatives, sulfolane, methylsulfolane, propylene carbonate derivatives, tetrahydrofuran, and mixtures thereof. For example, the polar aprotic solvent is propylene carbonate (PC).

According to one embodiment, the concentration of the polymer in the electrolyte composition is between 5% and 100% by weight, between 10% and 100% by weight, between 20% and 100% by weight, between 30% and 100% by weight, between 40% and 100% by weight, between 50% and 100% by weight, between 60% and 100% by weight, between 75% and 100% by weight, and between 90% and 100% by weight, upper and lower limits included.

The present application also provides an electrode material comprising an electrochemically active material and a polymer as defined herein. According to one variant of interest, the binder comprises a polymer as described herein. Alternatively, the polymer as described herein is present in the electrode material in the form of a coating on electrochemically active material particles.

The present application also proposes an electrochemical cell comprising a negative electrode, a positive electrode and an electrolyte, wherein at least one of the negative electrode, the positive electrode and the electrolyte comprises a polymer of the present application. For example, the polymer is present in the electrolyte, or in one of the positive and negative electrodes, or in one of the electrodes and in the electrolyte. According to one example, the electrochemical cell comprises the electrolyte of the present application. According to a variant of interest, the negative electrode is lithium.

For example, the polymer of the present description can be combined with different inorganic materials to form composites. For example, the inorganic particles can be inactive such as titanium dioxide ($TiO_2$), silicon dioxide ($SiO_2$), and aluminum oxide ($Al_2O_3$). Alternatively, the inorganic particles can be active such as, for example, lithium lanthanum titanate $Li_{0.33}La_{0.557}TiO_3$ (LLTO), lithium lanthanum zirconate $Li_7La_3Zr_2O_{12}$ (LLZO), and $Li_{6.75}La_3Zr_{1.75}Ta_{0.25}O_{12}$ (LLZTO). According to one example, the functionalities of the polymer of the present description allow to graft it onto electrochemically active or inactive micro or nanoparticles to increase the ionic conductivity/transport number of the polymer and/or to increase the mechanical properties of the final composite.

According to another aspect, the positive electrode comprises a positive electrode material which comprises an electrochemically active material, for example, in the form of particles. Examples of electrochemically active positive electrode materials include lithium metal phosphates and complex oxides such as $LiM'PO_4$ where M' is Fe, Ni, Mn, Co, or a combination thereof, $LiV_3O_8$, $V_2O_5$, $LiMn_2O_4$, $LiM"O_2$ where M" is Mn, Co, Ni, or a combination thereof, $Li(NiM''')O_2$ where M''' is Mn, Co, Al, Fe, Cr, Ti, or Zr, or combinations thereof. The positive electrode material may also further comprise an electronically conductive material, a binder, or a combination of both. According to a variant of interest, the binder comprises a polymer as described herein. Alternatively, the polymer as described herein is present in the electrode material as a coating on electrochemically active material particles.

According to one embodiment, the electronically conductive material is selected from carbon black, Ketjen™ carbon, acetylene black, graphite, graphene, carbon nanotubes, and carbon fibers (such as carbon nanofibers or VGCFs formed in the gas phase), or a combination of at least two thereof. According to one variant of interest, the electronically conductive material is a combination of acetylene black (such as Denka carbon HS100) and VGCFs.

According to one example, the positive electrode material can be applied to a current collector (for example, aluminum or copper) to form the positive electrode. According to another variant, the positive electrode can be self-supported. According to one variant of interest, the current collector is made of carbon-coated aluminum.

According to another example, the SPE membranes and/or the electrodes comprising the polymer of the present description can be continuously formed on roll-to-roll processing systems for large-scale production.

According to another aspect, an electrochemical cell of the present application is included in an electrochemical accumulator. For example, the electrochemical accumulator is selected from a lithium battery, a sodium battery, a potassium battery, and a lithium-ion battery. According to one variant of interest, the electrochemical accumulator is a lithium-ion battery.

According to another aspect, the electrochemical accumulators of the present application are used in portable devices, for example, mobile phones, cameras, tablets, or laptops, in electric or hybrid vehicles, or in renewable energy storage.

EXAMPLES

The following examples are illustrative and should not be construed as further limiting the scope of the invention as described.

Example 1—Synthesis of Polymers (a) Synthesis of a Crosslinked Polymer Film: Polycaprolactone-Block-Polytetrahydrofuran-Block-Polycaprolactone Diacrylate (Polymer P1

The synthesis of the polymer was carried out in a 500 ml flask fitted with a magnetic bar by solubilizing 72 g of a commercial polycaprolactone-block-polytetrahydrofuran-block-polycaprolactone having a molecular weight of 2,000 g/mol in 160 g of toluene. Acrylic acid (12.8 g), hydroquinone (0.4 g), and p-toluenesulfonic acid (1.6 g) were then added. Subsequently, the solution was stirred at a temperature of 80° C. under partial vacuum for 24 hours to extract the water by azeotropic distillation. The solvent was then evaporated using a rotary evaporator under vacuum at a temperature of 60° C. for 2 hours. 200 g of a saturated sodium bicarbonate aqueous solution and 100 ml of water were then added to the flask containing the polymer.

The solution was then stirred until the polymer was neutralized. Once the agitation was stopped, the polymer deposited at the bottom of the flask and the supernatant was decanted. Subsequently, the polymer was washed six times with nanopure water under vigorous stirring, and then separated by centrifugation. The polymer was then dried using a rotary evaporator, and then analyzed by Fourier-transform infrared spectroscopy (FTIR), differential scanning calorimetry (DSC), and nuclear magnetic resonance spectroscopy (NMR).

The Polymer P1 thus obtained had the following properties: a glass transition temperature ($T_g$)=−78.13° C., and a melting point (mp)=18-34.5° C. After crosslinking by UV irradiation, the $T_g$ was −72° C. and the polymer was amorphous.

(b) Synthesis of a Gel Polymer: Polycaprolactone-Block-Polytetrahydrofuran-Block-Polycaprolactone Di-2-(2-Methoxyethoxy) Ester (Polymer P2

The synthesis of this polymer was carried out in a 500 ml flask fitted with a magnetic bar by solubilizing 72 g of a commercial polycaprolactone-block-polytetrahydrofuran-block-polycaprolactone having a molecular weight of 2,000 g/mol in 160 g of toluene. Subsequently, 11.9 g of 2-(2-methoxyethoxy)acetic acid, 0.4 g of hydroquinone, and 1.6 g of p-toluenesulfonic acid were added. The solution was stirred at a temperature of 80° C. under partial vacuum for 24 hours to extract the water by azeotropic distillation. The solvent was then evaporated on a rotary evaporator under vacuum at a temperature of 60° C. for 2 hours. Subsequently, 200 g of a saturated sodium bicarbonate aqueous solution and 100 ml of water were added to the flask containing the polymer.

The solution was then vigorously stirred until the polymer was neutralized. Once the agitation was stopped, the polymer deposited at the bottom of the flask, and the supernatant was decanted. Subsequently, the polymer was washed six times with nanopure water under vigorous stirring and was separated by centrifugation. The isolated polymer was dried using a rotary evaporator and then analyzed by FTIR, DSC and NMR.

The Polymer P2 thus obtained had the following properties: $T_g=-76.22°$ C. and mp=16.5-26.5° C.

Example 2—Preparation of Symmetrical Cells

The preparation of the symmetrical cells of Examples 2(a) to 2(c) was entirely carried out in an anhydrous chamber.

(a) Preparation of Symmetrical Cells Comprising Only the Polymer P1

The Polymer P1 (3 g) was dissolved using a vortex in a bottle (vial) with 3 g of ethanol, 0.53 g of lithium bis (trifluoromethanesulfonyl)imide (LiTFSI), and 0.015 g of Irgacure™ 651 (2,2-dimethoxy-2-phenylacetophenone, a photo-crosslinking agent). The solution was then spread by the Doctor blade method on a stainless steel current collector, and then dried in the oven at a temperature of 75° C. for a period of 5 minutes before being inserted in a UV oven under a continuous flow of an inert atmosphere of nitrogen. An intensity of 300 WPI was applied for 5 minutes to induce crosslinking of the polymer. Thereafter, the coating was left overnight in the oven at a temperature of 75° C. before its use.

The ionic conductivity of the polymer thus obtained was measured between two stainless steel electrodes. A value of $4.41\times10^{-6}$ S/cm was obtained at a temperature of 30° C.

(b) Preparation of Symmetrical Cells Comprising the Polymers P1 and P2

The Polymer P1 (3 g) and the Polymer P2 (3 g) were dissolved in a vial with 6 g of ethanol, 1.06 g of LiTFSI, and 0.015 g of Irgacure™ 651 using a vortex. Subsequently, the solution was spread by the Doctor blade method on a stainless steel collector, and then dried in the oven at a temperature of 75° C. for a period of 5 minutes before being inserted in a UV oven under a continuous flow of an inert atmosphere of nitrogen. An intensity of 300 WPI was applied for 5 minutes to induce the crosslinking of the polymer. Subsequently, the coating was left overnight in the oven at a temperature of 75° C. prior to its use.

The ionic conductivity of the polymer blend comprising the Polymer P1 and the Polymer P2 thus obtained was measured between two stainless steel electrodes. A value of $1.08\times10^{-5}$ S/cm was obtained at a temperature of 30° C.

(c) Preparation of Symmetrical Cells Comprising the Polymer P1 and a Liquid Electrolyte The Polymer P1 (3 g) and 0.53 g of LiTFSI were dissolved in a predetermined amount of a previously prepared 1 M solution of LiTFSI in PC (see Table 1) and 0.015 g of Irgacure™ 651 using a vortex. Subsequently, the solution was spread by the Doctor blade method on a stainless steel collector and then inserted into a UV oven under a continuous flow of an inert atmosphere of nitrogen. An intensity of 300 WPI was applied for 5 minutes to induce crosslinking. The coating was then used as is without preheating in the oven to prevent evaporation of the PC.

TABLE 1

Ionic conductivity as a function of the mass percentage of propylene carbonate

| Sample | PC vs. PC + copolymer (% by weight) | PC weight (g) | Ionic conductivity at 30° C. (S/cm) | Ionic conductivity at 80° C. (S/cm) |
| --- | --- | --- | --- | --- |
| E1 | 50 | 3 | $7.82\times10^{-4}$ | $1.54\times10^{-3}$ |
| E2 | 40 | 2 | $6.11\times10^{-4}$ | $1.22\times10^{-3}$ |
| E3 | 25 | 1.24 | $2.61\times10^{-4}$ | $6.67\times10^{-4}$ |
| E4 | 10 | 0.415 | $4.27\times10^{-5}$ | $2.83\times10^{-4}$ |
| E5 | 0 | 0 | $4.41\times10^{-6}$ | $7.99\times10^{-5}$ | d) Preparation of Symmetrical Cells (Lithium/SPE/Lithium) Comprising Only the Polymer P1

The SPE was prepared as described in Example 2(a) by replacing the stainless steel current collector with a polypropylene film. An 80 μm thick SPE was then detached from the polypropylene film using hexane, transferred to a PTFE sheet and covered with another PTFE sheet. The SPE sandwiched between two PTFE sheets was then punched to obtain an SPE separator and to assemble a lithium/SPE/lithium battery. The assembly was carried out in a glove box.

The transport number of the Polymer P1 was measured between two lithium electrodes. An average value of 0.71 was obtained with 4 cells at a temperature of 50° C.

Example 3—Preparation of LiFePO$_4$/SPE/Lithium Batteries a) Preparation of LiFePO$_4$/SPE/Lithium Batteries Including Only the Polymer P1

The preparation is entirely carried out in an anhydrous chamber. 6 g of Polymer P1 were solubilized with 7.53 g of ethanol, 1.5 g of LiTFSI and 0.03 g of Irgacure™ 651 in a vortex bottle. 7.53 g of this solution was then transferred in a planetary centrifugal mixer container (THINKY™ type). 8.8 g of carbon-coated lithium iron phosphate (c-LFP), 0.475 g of acetylene black (Denka™ carbon HS-100), 0.475 g of carbon fibers (VGCF type), 0.015 g of azobisisobutyronitrile (AIBN) as thermal initiator, and 16 g of ethanol were then added into the container. The whole content was mixed 5 times for a period of 5 minutes, each time using a planetary centrifugal mixer (THINKY™ type mixer) to disperse the powders and obtain a homogeneous solution. This positive electrode solution was then spread by the Doctor blade method on a carbon-coated aluminum collector, and then dried and crosslinked in an oven at a temperature of 120° C. for 2 hours.

Subsequently, the stock solution containing the polymer, lithium salt, and UV initiator was spread by the Doctor blade method on the positive electrode. The positive electrode with the SPE coating thus obtained was dried in the oven at a temperature of 75° C. for 5 minutes before being inserted in a UV oven under a continuous flow of an inert atmosphere of nitrogen. An intensity of 300 WPI was then applied for 5 minutes to induce crosslinking. The coating was then left overnight in the oven at 75° C. before its use.

The batteries were assembled with a 45 μm thick metallic lithium anode. Two different battery formats were used: button cell and pouch cell formats.

(b) Preparation of LiFePO$_4$/SPE/Lithium Battery Including Polymers P1 and P2

The preparation is entirely carried out in an anhydrous chamber. 3 g of Polymer P1 and 3 g of Polymer P2 were solubilized with 6 g of ethanol, 1.06 g of LiTFSI, and 0.015 g of Irgacure™ 651 in a flask using a vortex. 6.54 g of this solution were then transferred in a planetary centrifugal mixer container (THINKY™ type). 8.24 g of carbon-coated lithium iron phosphate (c-LFP), 0.445 g of acetylene black (Denka™ carbon HS-100), 0.445 g of carbon fibers (VGCF type), 0.0075 g of AIBN as thermal initiator, and 16 g of ethanol were then added into the container. The whole content was then mixed, spread, dried, and crosslinked as described in Example 3(a).

Subsequently, the stock solution containing the polymer, lithium salt, and UV initiator was spread by the Doctor blade method on the positive electrode. The positive electrode thus obtained with the SPE coating was dried in the oven at a temperature of 75° C. for 5 minutes before being inserted in a UV oven under a continuous flow of an inert atmosphere of nitrogen. An intensity of 300 WPI was then applied for 10 minutes to induce crosslinking. The coating was then left overnight in the oven at 75° C. before its use. The batteries were assembled as described in Example 3 (a).

Example 4—Electrochemical Properties (a) Formation and Stability Cycling

The formation and stability cycling tests of a battery prepared in Example 3(a) were carried out at different charge and discharge rates and at different temperatures. The results are presented for a battery having a total load of 4.39 mg/cm$^2$, an SPE having a thickness of 20 μm, and a 25 μm thick positive electrode.

Figure 1:
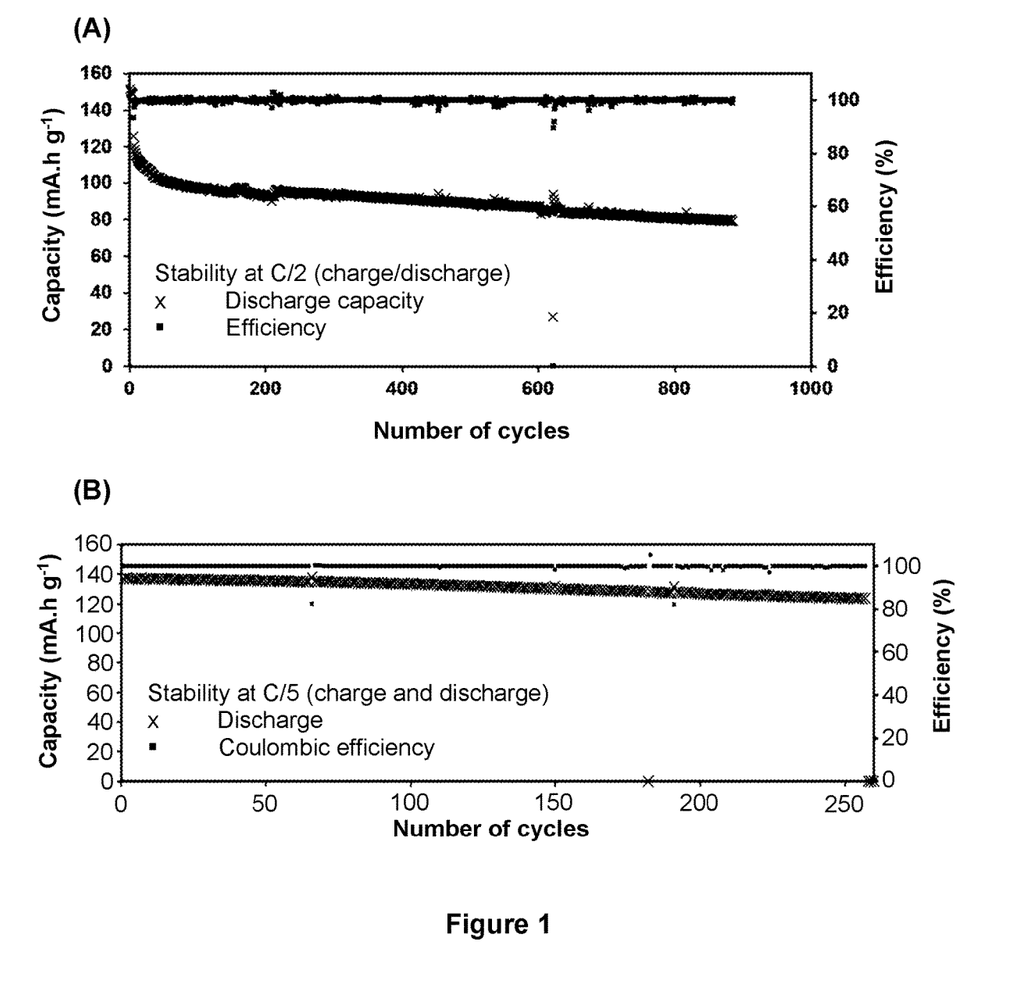
FIG. 1 shows the stability cycling results of a battery according to one embodiment, where the discharge capacity and efficiency were recorded: (A) at a charge/discharge rate of C/24 for the first 5 cycles and then of C/2 at a temperature of 50° C.; and (B) at a charge/discharge rate of C/5 at a temperature of 50° C., as described in Example 4(a).

FIG. 1A shows the cycling of a battery obtained in Example 3(a). During the formation (first 5 charge/discharge cycles) at C/24 and at 50° C., a stable capacity of 149 mAh/g was obtained with an efficiency close to 100%. The battery was then started in stability at C/2 (charge/discharge) again at 50° C. A rapid decrease in capacity was observed during the first 40 cycles, and then it stabilized at about 100 mAh/g. After more than 880 cycles, the capacity was approximately 80 mAh/g while keeping a high efficiency of about 100%.

FIG. 1B shows the cycling of a battery obtained in Example 3(a), at a rate of C/5 (charge/discharge) and at 50° C. At these cycling rate and temperature, a very significant stability with an initial capacity of 137 mAh/g in the first cycle, a capacity of 123 mAh/g after the 257th cycle, and an efficiency of 99.9% were observed.

Figure 2:
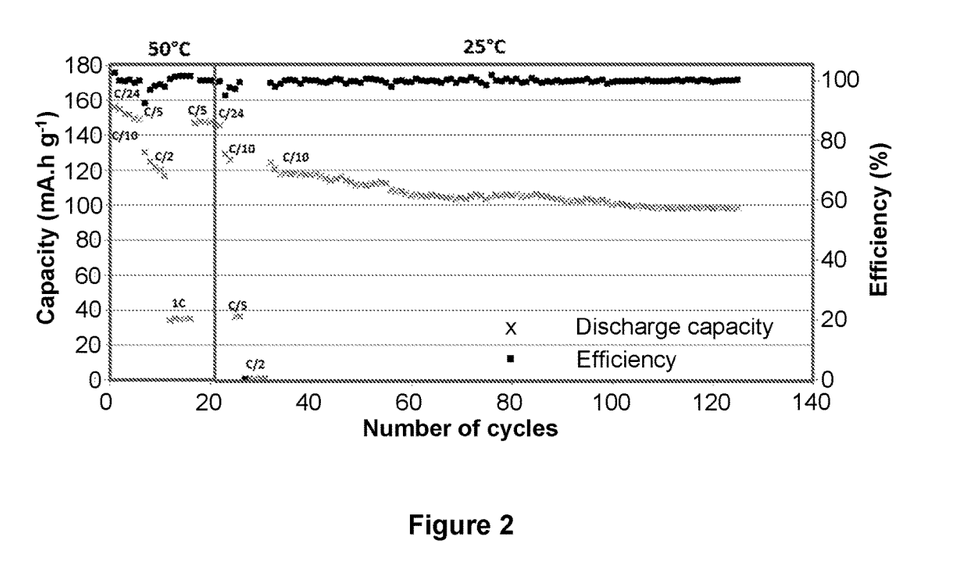
FIG. 2 shows the discharge capacity results as described in Example 4(a), and this, at different charge/discharge rates and at different temperatures for a battery according to one embodiment.

FIG. 2 shows the cycling of a battery obtained in Example 3(a) at different charge/discharge rates and at different temperatures. The box on the left and right show the cycling results at 50° C. and 25° C. temperatures, respectively. At a temperature of 50° C., it was observed that the battery can be cycled up to C/5 while maintaining a high capacity of about 150 mAh/g. It was observed that at C/2 and 1 C rates, the capacity decreases more rapidly and becomes respectively less than 120 mAh/g and 40 mAh/g after 5 cycles. When used at 25° C., it was observed that the battery has a good capacity of about 145 mAh/g at C/24 but decreases below 40 mAh/g at a rate of C/5. The battery was then tested for stability at a rate of C/10 and it was observed that after more than 90 cycles the battery still had a capacity of about 100 mAh/g and tended to stabilize.

The formation and stability cycling tests of a battery prepared in Example 3(b) were carried out at different charge and discharge rates and at different temperatures. The results are presented for a battery comprising a total load of 5.72 mg/cm$^2$, an SPE having a thickness of 20 μm, and a 32 μm thick positive electrode.

Figure 3:
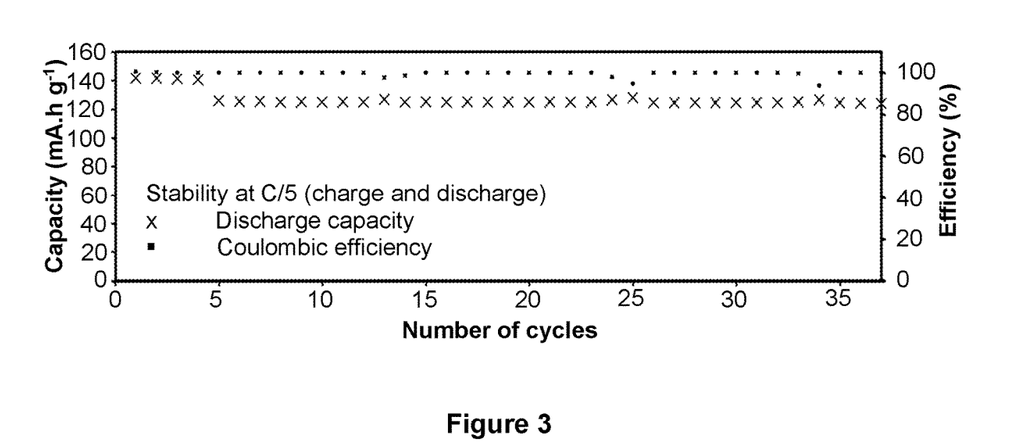
FIG. 3 shows the stability cycling results as described in Example 4(a) for a battery according to one embodiment.

FIG. 3 shows the cycling of a battery obtained in Example 3(b). During the formation (first 4 charge/discharge cycles) at C/24 and at 50° C., a stable capacity of about 141 mAh/g was obtained with an efficiency close to 100%. The battery was then started in stability at C/5 (charge/discharge) again at 50° C. At these cycling rate and temperature, a significant stability with an initial capacity of 125.9 mAh/g in the first cycle, a capacity of 124.2 mAh/g after the 33$^{rd}$ cycle, and an efficiency of 99.9% were observed.

(b) Cyclic Voltammetry

Figure 4:
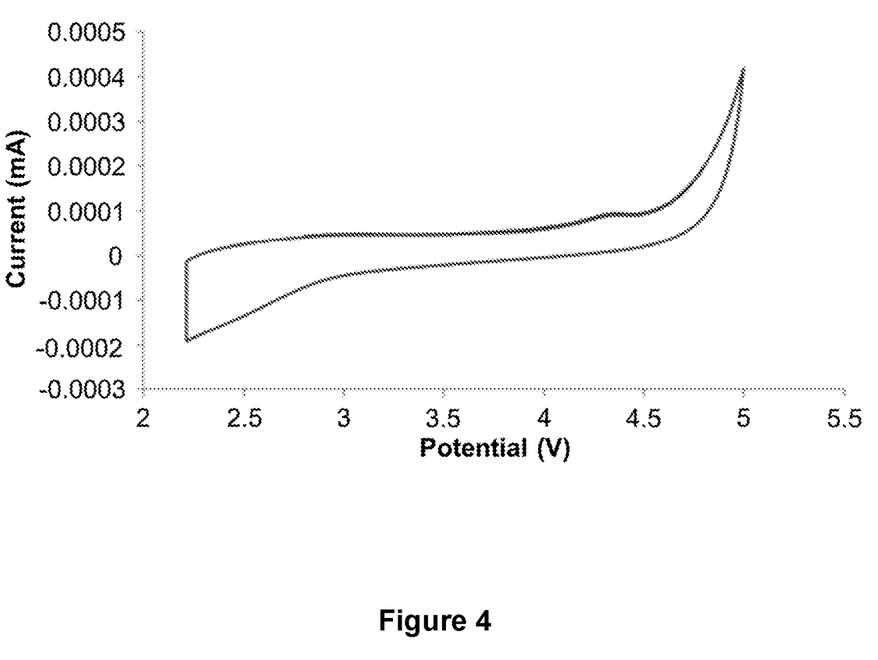
FIG. 4 shows the cyclic voltammetry results as described in Example 4(b) for a symmetrical cell according to one embodiment.

The stability of the symmetrical cell comprising the Polymer P1 alone obtained in Example 2(a) was assessed by cyclic voltammetry. FIG. 4 shows that the polymer is stable up to about 4.5 V allowing it to be used with high voltage materials. The results are presented for a scan rate of 0.1 mV/s and a temperature of 50° C.

Numerous modifications could be made to one or other of the embodiments described above without departing from the scope of the present invention as contemplated. Any references, patents or scientific literature documents referred to in the present application are incorporated herein by reference in their entirety for all purposes.

The invention claimed is:

1. A polymer comprising at least one ester repeating unit and one ether repeating unit, the polymer being of Formula II:

Formula II

-continued wherein x, y and z are integers each independently selected such that the average molecular weight of the polymer is between 200 g/mol and 5,000,000 g/mol, or between 200 g/mol and 1,000,000 g/mol, or between 200 g/mol and 500,000 g/mol, or between 400 g/mol and 100,000 g/mol, or between 400 g/mol and 20,000 g/mol, and wherein x≥1 and y+z≥1.

2. The polymer of claim 1, wherein said polymer is polycaprolactone-block-polytetrahydrofuran-block-polycaprolactone diacrylate.

3. A polymer being polycaprolactone-block-polytetrahydrofuran-block-polycaprolactone di-2-(2-methoxyethoxy) ester.

4. The polymer of claim 1, said polymer being crosslinked and wherein the crosslinking of said polymer is carried out by UV irradiation, by heat treatment, by microwave, under an electron beam, by gamma irradiation, or by X-ray irradiation.

5. An electrolyte comprising a polymer and an ionic salt, wherein:
the polymer comprises at least one ester repeating unit and one ether repeating unit, the polymer being of Formula I:

Formula I wherein:
x, y, and z are integers each independently selected such that the average molecular weight of the polymer is between 200 g/mol and 5,000,000 g/mol, or between 200 g/mol and 1,000,000 g/mol, or between 200 g/mol and 500,000 g/mol, or between 400 g/mol and 100,000 g/mol, or between 400 g/mol and 20,000 g/mol, where x≥1 and y+z≥1;

$R_1$ and $R_2$ are linear or branched substituents each independently selected from hydrogen, $C_{1-21}$alkyl, $C_{2-22}$alkenyl, $C_{1-10}$alkoxyalkyl, $C_{1-10}$alkyl-(acrylate), and $C_{1-10}$alkyl-(methacrylate);

n, m, o, and p are integers, where o is between 1 and 10 and n, m, and p are between 0 and 10; and A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups; and the ionic salt is a lithium salt selected from lithium hexafluorophosphate (LiPF$_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate (LiBF$_4$), lithium bis(oxalato)borate (LiBOB), lithium nitrate (LiNO$_3$), lithium chloride (LiCl), lithium bromide (LiBr), lithium fluoride (LiF), lithium perchlorate (LiClO$_4$), lithium hexafluoroarsenate (LiAsF$_6$), lithium trifluoromethanesulfonate (LiSO$_3$CF$_3$) (LiTf), lithium fluoroalkylphosphate Li[PF$_3$(CF$_2$CF$_3$)$_3$](LiFAP), lithium tetrakis(trifluoroacetoxy)borate Li[B(OCOCF$_3$)$_4$](LiTFAB), lithium bis(1,2-benzenediolato(2-)-O,O')borate Li[B(C$_6$O$_2$)$_2$] (LBBB), and their combinations.

6. An electrolyte comprising a polymer and a polar aprotic solvent, wherein:
the polymer comprises at least one ester repeating unit and one ether repeating unit, the polymer being of Formula I:

Formula I wherein:
x, y, and z are integers each independently selected such that the average molecular weight of the polymer is between 200 g/mol and 5,000,000 g/mol, or between 200 g/mol and 1,000,000 g/mol, or between 200 g/mol and 500,000 g/mol, or between 400 g/mol and 100,000 g/mol, or between 400 g/mol and 20,000 g/mol, where x≥1 and y+z≥1;

$R_1$ and $R_2$ are linear or branched substituents each independently selected from hydrogen, $C_{1-21}$alkyl, $C_{2-22}$alkenyl, $C_{1-10}$alkoxyalkyl, $C_{1-10}$alkyl-(acrylate), and $C_{1-10}$alkyl-(methacrylate);

n, m, o, and p are integers, where o is between 1 and 10 and n, m, and p are between 0 and 10; and A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups; and the polar aprotic solvent is selected from ethylene carbonate (EC), diethyl carbonate (DEC), propylene carbonate (PC), dimethyl carbonate (DMC), ethylmethyl carbonate (EMC), vinylene carbonate (VC), methyl butyrate (MB), γ-butyrolactone (γ-BL), γ-valerolactone (γ-VL), 1,2-dimethoxyethane (DME), 1,2-diethoxyethane (DEE), 2-methyltetrahydrofuran, dimethylsulfoxide, formamide, acetamide, dimethylformamide, dioxolane, acetonitrile, propylnitrile, nitromethane, ethylmonoglyme, trimethoxymethane, dioxolane derivatives, sulfolane, methylsulfolane, propylene carbonate derivatives, tetrahydrofuran, and their mixtures.

7. An electrode material comprising an electrochemically active material and a polymer comprising at least one ester repeating unit and one ether repeating unit, the polymer being of Formula I:

Formula I wherein:

x, y, and z are integers each independently selected such that the average molecular weight of the polymer is between 200 g/mol and 5,000,000 g/mol, or between 200 g/mol and 1,000,000 g/mol, or between 200 g/mol and 500,000 g/mol, or between 400 g/mol and 100,000 g/mol, or between 400 g/mol and 20,000 g/mol, where x≥1 and y+z≥1;

$R_1$ and $R_2$ are linear or branched substituents each independently selected from hydrogen, $C_{1-21}$alkyl, $C_{2-22}$alkenyl, $C_{1-10}$alkoxyalkyl, $C_{1-10}$alkyl-(acrylate), and $C_{1-10}$alkyl-(methacrylate);

n, m, o, and p are integers, where o is between 1 and 10 and n, m, and p are between 0 and 10; and A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups.

8. An electrochemical cell comprising a negative electrode, a positive electrode, and an electrolyte, wherein at least one of the negative electrode, the positive electrode, and the electrolyte comprises a polymer comprising at least one ester repeating unit and one ether repeating unit, the polymer being of Formula I:

Formula I wherein:

x, y, and z are integers each independently selected such that the average molecular weight of the polymer is between 200 g/mol and 5,000,000 g/mol, or between 200 g/mol and 1,000,000 g/mol, or between 200 g/mol and 500,000 g/mol, or between 400 g/mol and 100,000 g/mol, or between 400 g/mol and 20,000 g/mol, where x≥1 and y+z≥1;

$R_1$ and $R_2$ are linear or branched substituents each independently selected from hydrogen, $C_{1-21}$alkyl, $C_{2-22}$alkenyl, $C_{1-10}$alkoxyalkyl, $C_{1-10}$alkyl-(acrylate), and $C_{1-10}$alkyl-(methacrylate);

n, m, o, and p are integers, where o is between 1 and 10 and n, m, and p are between 0 and 10; and A and B are substituted or unsubstituted groups each independently selected from alkyls, alkenyls, alkynyls, acetyls, alkoxyls, epoxy-comprising groups, furan-comprising groups, primary amine-comprising groups, maleimide-comprising groups, acrylate-comprising groups, and acid groups.

9. The electrochemical cell of claim 8, wherein the positive electrode comprises a positive electrode electrochemically active material and a binder.

10. The electrochemical cell of claim 8, wherein the electrolyte comprises the polymer.

11. An electrochemical accumulator comprising at least one electrochemical cell as defined in claim 8.

12. An electrolyte comprising a polymer as defined in claim 1.

13. An electrode material comprising an electrochemically active material and a polymer as defined in claim 1.

14. A composition comprising at least one polymer as defined in claim 1, and at least element selected from a liquid electrolyte, an ionic salt, an ionic liquid, a polymer, an inorganic particle, a polar aprotic solvent, and an additive.

15. An electrochemical cell comprising a negative electrode, a positive electrode, and an electrolyte, wherein at least one of the negative electrode, the positive electrode, and the electrolyte comprises a polymer as defined in claim 1.

16. An electrochemical accumulator comprising at least one electrochemical cell as defined in claim 15.

17. An electrolyte comprising a polymer as defined in claim 3.

18. An electrode material comprising an electrochemically active material and a polymer as defined in claim 3.

19. A composition comprising at least one polymer as defined in claim 3, and at least element selected from a liquid electrolyte, an ionic salt, an ionic liquid, a polymer, an inorganic particle, a polar aprotic solvent, and an additive.

20. An electrochemical cell comprising a negative electrode, a positive electrode, and an electrolyte, wherein at least one of the negative electrode, the positive electrode, and the electrolyte comprises a polymer as defined claim 3.

21. An electrochemical accumulator comprising at least one electrochemical cell as defined in claim 20.

22. The electrolyte comprising of claim 5, wherein said electrolyte is a solid polymer electrolyte (SPE) or a gel electrolyte.

23. The electrolyte comprising of claim 5, wherein said electrolyte further comprises an ionic liquid, a separator, a polar aprotic solvent, an additive, or a combination of at least two thereof.

24. The electrolyte comprising of claim 5, wherein said electrolyte is a solid polymer electrolyte (SPE) or a gel electrolyte.

25. The electrolyte comprising of claim 6, wherein said electrolyte further comprises an ionic salt, an ionic liquid, a separator, an additive, or a combination of at least two thereof.

26. The electrode material of claim 7, wherein the polymer is a binder.

27. The electrochemical cell of claim 9, wherein the binder comprises the polymer.

28. The electrochemical cell of claim 9, wherein the positive electrode further comprises an electronically conductive material.

29. The electrochemical accumulator of claim 11, wherein said electrochemical accumulator is selected from a lithium battery, a sodium battery, a potassium battery, and a lithium-ion battery.

30. The electrolyte comprising of claim 12, wherein said electrolyte is a solid polymer electrolyte (SPE) or a gel electrolyte.

31. The electrolyte comprising of claim 12, wherein said electrolyte further comprises an ionic salt, an ionic liquid, a separator, a polar aprotic solvent, an additive, or a combination of at least two thereof.

32. The electrode material of claim 13, wherein the polymer is a binder.

33. The electrochemical accumulator of claim 16, wherein said electrochemical accumulator is selected from a lithium battery, a sodium battery, a potassium battery, and a lithium-ion battery.

34. The electrolyte of claim 17, wherein said electrolyte is a solid polymer electrolyte (SPE) or a gel electrolyte.

35. The electrolyte of claim 17, wherein said electrolyte further comprises an ionic salt, an ionic liquid, a separator, a polar aprotic solvent, an additive, or a combination of at least two thereof.

36. The electrode material of claim 18, wherein the polymer is a binder.

37. The electrochemical accumulator of claim 21, wherein said electrochemical accumulator is selected from a lithium battery, a sodium battery, a potassium battery, and a lithium-ion battery.

* * * * *